United States Patent [19]
Shoji et al.

[11] Patent Number: 5,157,066
[45] Date of Patent: Oct. 20, 1992

[54] FLUOROALKYL ETHER, SURFACE MODIFYING COMPOSITION AND METHOD FOR MODIFYING SURFACE

[75] Inventors: Mitsuyoshi Shoji, Ibaraki; Takayuki Nakakawaji, Hitachi; Yutaka Ito, Takahagi; Shigeki Komatsuzaki; Akio Mukoh, both of Mito, all of Japan

[73] Assignee: Hitachi, Ltd., Tokyo, Japan

[21] Appl. No.: 724,724

[22] Filed: Jul. 2, 1991

Related U.S. Application Data

[63] Continuation of Ser. No. 411,882, Sep. 25, 1989.

[51] Int. Cl.⁵ .................... C08J 5/12; C08K 5/20; C08K 5/36; C08K 5/48; C08L 27/12
[52] U.S. Cl. .................... 524/220; 524/225; 524/226; 524/227; 524/171; 568/684; 564/153; 564/154; 564/158
[58] Field of Search ........... 524/220, 225, 226, 227, 524/171; 568/684; 564/153, 154, 158

Primary Examiner—Kriellion S. Morgan
Assistant Examiner—U. K. Rajguru
Attorney, Agent, or Firm—Antonelli, Terry Stout & Kraus

[57] ABSTRACT

A solid surface modifying composition comprising a film forming material and a fluoroalkyl ether $((Rf)_m(CONH-X-NHCO-Y)_m$ (m=1 or 2; Rf: perfluoropolyether chain; X:

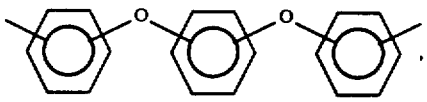

etc.;

Y: 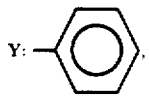 , etc.) provides surfaces with such improvements as durable water and oil repellency, lubricity and lowered surface energy. The lubricating protective coating is applicable for coatings of recording mediums, photoreceptors and wirings.

8 Claims, 1 Drawing Sheet

FIG. 1

FLUOROALKYL ETHER, SURFACE MODIFYING COMPOSITION AND METHOD FOR MODIFYING SURFACE

This is a continuation of application Ser. No. 411,882, filed Sep. 25, 1989.

The present invention relates to a novel fluoroalkyl ether, a solid surface modifying composition containing said ether, and a method for modifying solid surfaces by using said composition.

For preventing contamination of solid surfaces or for providing water and/or oil repellency to solid surfaces, surface modifying methods are popularly used in which a fluorine-containing surface active agent is applied on a solid surface to be treated. For instance, Japanese Patent Publication No. 19670/86 proposes application of a fluorine-containing surface active agent having the following chemical structure;

(wherein R'f represents a perfluorohexeneyl or perfluorononyl group) on a solid surface to provide it with water and oil repellency. Further, Japanese Patent Publication No. 36172/79 discloses a fluorine-containing surface active agent having the structure of $(CF_3-(CF_2)_{n2}-(CH_2)_{m2}-X_2-COO)_2-M_2$. This surfactant is applied on a solid surface to form a monomolecular layer film thereon, and the film is then irradiated with gamma rays or ultraviolet rays to develop a monomolecular layer polymerized film. This film is not only useful as a water and oil repellent film but is also expected as a lubricating film.

For the improvement of lubricity of a solid surface, there are generally known a method in which a fluorine-containing lubricant is applied on a solid surface (U.S. Pat. Nos. 3,490,946 and 3,778,308) and a method in which a fluorine-containing surface active agent is applied on a solid surface (Japanese Patent Application Kokai (Laid-Open) Nos. 116931/84, 41431/83, 29147/83, 154619/82 and 44226/82). The "fluorine-containing surface active agent" referred to therein is a compound of the formula; $C_{n'}F_{2n'+1}-X_3$, which is disclosed in Japanese Patent Application Kokai (Laid-Open) No. 29147/83.

As a surface modifying method for increasing lubricity of a solid surface by fixing a fluorine compound thereon, uses of fluorine compounds having various types of reactive terminal functional groups such as silanols and acrylates (U.S. Pat. No. 4,120,995; JP Pat. Appln. Kokai Nos. 36171/79, 203239/84, 38730/85, 172159/84 and 39919/86) and fluorine compounds having phosphoric ester type reactive groups (JP Pat. Appln. Kokai Nos. 109028/85, 101717/85, 246020/85, 212809/85 and 427270/86) have been proposed.

However, according to the method in which a fluorine-containing surface active agent is applied on a solid surface to obtain water and oil repellency thereof, the surface active agent may dissipate into the air when the coated product is left unused for a long time as said surfactant is not fixed firm to the solid surface, and so the coated product cannot be improved sufficiently on durability in water and oil repellency.

On the other hand, the method of developing a water and oil repellent polymer film by irradiating a monomolecular layer film with gamma or ultraviolet rays is complicated in the operating procedure and is impractical. The method in which a fluorine compound is fixed on a solid surface by means of a chemical reaction has problems that the reaction involves difficulties in carrying it out and that a homogeneously reacted film is hardly obtainable.

As described above, it has barely been possible to attain a surface modification with sufficiently high durability through simple operations by the use of hitherto proposed fluorine-containing surface active agents and fluorine compounds.

Accordingly, it is an object of the present invention to provide a novel fluoroalkyl ether with which the desired modification of solid surfaces with good durability and by a simple process will be achieved.

It is a further object of the present invention to provide a solid surface modifying composition comprising said fluoroalkyl ether.

It is a still further object of the present invention to provide a method of modifying solid surface by the use of said composition.

In accordance with the invention, a novel fluoroalkyl ether having an amide bond in its molecular structure as represented by the following formula [I] is provided;

$$(Rf\!-\!CONH\!-\!X\!-\!NHCO\!-\!Y)_m \qquad [I]$$

wherein m = 1 or 2; Rf represents

(n = 1 to 50) or $-(C_2F_4O)_x(CF_2O)_y(CF_2)_z$ each of x and y = 1 to 50, and z = 0 or 1); X represents Y represents (n is as defined above)].

According to the invention, there is provided a composition useful for modifying solid surfaces, which composition is obtained by blending said fluoroalkyl ether with a film-forming resin.

It is also envisaged in the invention to provide a method for modifying solid surfaces by applying said composition on a solid surface to be modified.

The fluoroalkyl ether according to the invention is a compound in which the perfluoropolyether chain is bonded to a lipophilic organic group in its molecular structure. When this compound is mixed with a film-forming material and the mixture applied on a solid surface to form a thin hardened film thereon, the perfluoropolyether chain (Rf) separates out on the surface of the hardened film while the organic group stays embedded in the hardened film, and said perfluoropolyether chain (Rf) is fixed in this state.

Thus, according to the present invention, it is possible to attain such solid surface modifications as providing durable water and oil repellency and lubricity to a solid surface; lowering surface energy and dielectric constant; affording corrosion resistance; and reducing stress, etc., with simplified operations.

Figure 1:
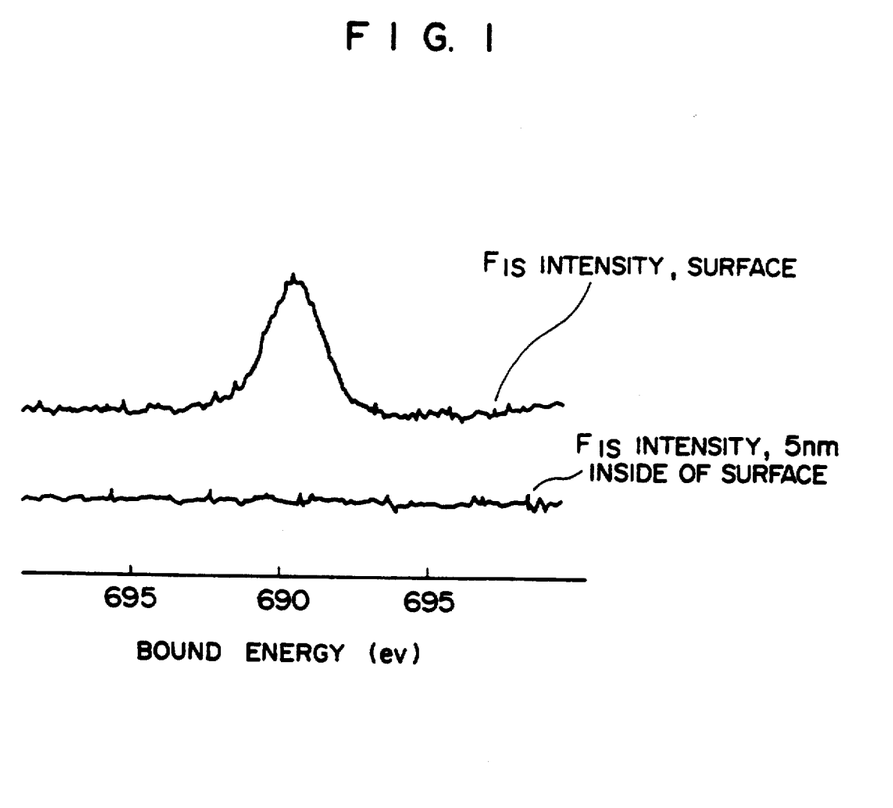

FIG. 1 of the accompanying drawing is a graph showing a measurement of fluorine intensity in the surface and inside of a hardened coating film formed with a composition of the present invention. The fluorine intensity in the surface layer and at a depth of 5 nm from the surface was measured by using an X-ray photoelectron spectroscopy (XPS), and the result shows that fluorine exists in the film surface alone and no fluorine presents at a point of 5 nm depth from the surface. This indicates that the perfluoropolyether chain exists only in the surface of the film.

The perfluoropolyether chain (Rf) in the compound of the present invention is available as a commercial preparation, typical examples thereof being du Pont's KRYTOX 143 and KRYTOX 157 series represented by the formula:

(n: an integer of 1 or greater) and Montefluose's FOMBLIN Y and FOMBLIN Z series represented by the formula:

or

(n: an integer of 1 or greater; x and y: 0 or an integer of 1 or greater).

Examples of the structural unit −(CONH—X—NH-CO—Y) in the fluoroalkyl ether of the present invention include the following:

The fluoroalkyl ethers provided according to the present invention include those of the following structural formulae:

As for a film forming resin to be blended with the fluoroalkyl ether for obtaining a composition useful for modification of solid surfaces in the present invention, it is preferred to use a synthetic resin for coating use having a unit structure similar to —(CONH—X—NH-CO—Y), which includes polyimide, polyetherimide, polyamideimide, polycarbonate, polyester, polyurethane, melamine resin, phenolic resin, polyhydroxystyrene, epoxy resin, unsaturated imides, and the like.

For modifying a solid surface according to the method of the invention, a composition, for example, containing the fluoroalkyl ether and a film forming resin is made into a solution by using a solvent suitable for paint and the solution is applied on a solid surface to form a thin coating film thereon, and then the coating film is hardened by heating and/or other means. In the thus obtained hardened film, the fluoroalkyl ether chain separates out and is oriented toward the film surface while the organic group containing no fluorine atom is embedded and fixed inside of the hardened film. Owing to this structure, the hardened film is provided with durable water and oil repellency; lubricity; lowered surface energy and dielectric constant; and reduced stress.

The products to which said solid surface modifying method of the invention can be applied effectively are diversified. Examples of such products are lubricating protective layers for magnetic recording media for which a high degree of lubricity is required; organic protective films for conductive support of photoreceptors; LSI coat films which require strong water repellency; laminates for computers which need strongly reduced dielectric constant; multi-layer wiring circuit boards; icing-preventive films; moistureproof protective films; anticontamination films; and the like.

The present invention will hereinafter be described in further detail by showing the non-limiting examples thereof.

(n = 14 on the average)

Separated from the above operations, 8 g (0.027 mol) of 1,4-bis(4-aminophenoxy)benzene, 1.9 g (0.0017 mol) of triethylamine and 70 ml of acetone dehydrated sufficiently with anhydrous magnesium sulfate were supplied into a 200 ml three-necked flask equipped with a refluxing device. Then, 2.4 g (0.017 mol) of benzoyl chloride was added dropwise to the solution under stirring at room temperature. After the dropwise addition ended, the reaction was further continued for one hour. The reaction solution was filtered and the filtrate was added with ethanol and again filtered. The resulting filtrate was subjected to column chromatography to obtain 2.55 g (0.0064 mol) of compound (A") having the following molecular structure:

The thus obtained 2.55 g of compound (A") was put into a 200 ml three-necked flask equipped with a refluxing device, followed by addition thereto of 30 ml of trifluorotrichloroethane, 35 ml of dehydrated acetone and 0.47 g of triethylamine. To the solution was added dropwise a trifluorotrichloroethane solution containing 12 g (0.005 mol) of the fluorine compound (A') to conduct a reaction at 60° C. for about one hour. The reaction solution was filtered and the filtrate was diluted with trifluorotrichloroethane and washed with methanol. Then trifluorotrichloroethane was distilled off to obtain 8.7 g of a brown viscous compound having the following structure:

(n = 14 on the average)

EXAMPLE 1

A solution of 12 g (0.0048 mol) of KRYTOX 157 FS-L (MW: 2,500) and 35 g of trifluorotrichloroethane was changed into a 300 ml three-necked flask provided with a refluxing device, followed by addition of 50 ml of thionyl chloride, and the mixture was allowed to react under stirring at 67° C. for 3 hours. Three drops of pyridine were also added to the reaction solution.

After the reaction, unreacted thionyl chloride, trifluorotrichloroethane and byproduct HCl were removed by vacuum distillation. The process gave a fluorine compound of KRYTOX 157 FS-L terminated with acid chloride in its molecular structure. This compound (A') had the following structure:

EXAMPLE 2

A solution containing 24 g (0.0048 mol) of KRYTOX 157 FS-M (MW: 4,800) and 70 g of trifluorotrichloroethane were changed into a 300 ml three-necked flask having a refluxing device. Then 100 ml of SOCl₂ was added and the mixture was caused to react under stirring at 67° C. for 3 hours. Three drops of pyridine were also added into the reaction solution.

After the reaction, unreacted SOCl₂, trifluorotrichloroethane and byproduct HCl were removed by vacuum distillation. As the result, there was obtained a fluorine compound (B') of KRYTOX 157 FS-M terminated with acid chloride.

In separate operations, a solution formed by dissolving 10 g of phenoxybenzoic acid pound (B") having the following structure:

in 100 ml of acetone was supplied into a 300 ml three-necked flask furnished with a refluxing device. Then the solution was added with 100 ml of SOCl₂ and allowed to react under stirring at 67° C. for 3 hours. Three drops of pyridine were also added to the reaction solution. Thereafter, unreacted SOCl₂, acetone and byproduct HCl were removed to obtain acid chloride of phenoxybenzoic Into a 100 ml three-necked flask provided with a refluxing device was put 5 g (0.0082 mol) of compound (B"). Then 1 g of triethylamine and 30 ml of acetone were added into the flask, and the solution was heated to 45° C. Thereafter, a solution of 20 ml of well dehydrated trifluorotrichloroethane and 15 g of fluorine compound (B') was added dropwise, carrying out the reaction over a period of one hour. After the reaction, the solution was filtered and then unreacted SOCl₂, acetone, trifluorotrichloroethane and byproduct HCl were removed by vacuum distillation. The distillation residue was dissolved in trifluorotrichloroethane and, after removing of brown crystals, washed with water and ethanol to yield 11.2 g of the objective product having the following structure:

acid .

Separated from the above operations, 8 g (0.027 mol) of 1,3-bis(4-aminophenoxy)benzene, 1.9 g (0.017 mol) of triethylamine and 500 ml of dehydrated acetone were supplied into a 1,000 ml three-necked flask with a refluxing device. To this solution, while stirring it at room temperature, there was added dropwise a solution prepared by adding 100 ml of acetone to 10 g of the acid chloride of phenoxybenzoic acid. The solution reacted under stirring at room temperature for 3 hours. After the reaction, the solution was filtered, and then unreacted SOCl₂, acetone and byproduct HCl were removed by vacuum distillation. The residue was columnchromatographed to obtain 16 g (0.032 mol) of compound (B") having the following structure:

H₂N—◯—O—◯—O—◯—NHCO—◯—O—◯

Then 7 g (0.014 mol) of compound (B") was put into a 200 ml eggplant type flask, followed by addition thereto of 2 g (0.014 mol) of 4-hydroxybenzoic acid, 4.3 g of methylchloropyridine iodide 3.3 g of triethylamine and 40 ml of dichloromethane. This solution was heated to 60° C. and allowed to react under stirring for about one hour. Then 25 ml of 5% HCl was added dropwise to the reaction solution and stirred well. The resultantly produced crystals were filtered out and washed with water to yield 5 g of compound (B") having the following structure:

(n = 29 on the average)

EXAMPLE 3

A solution of 44 g (0.02 mol) of KRYTOX 157 FS-L of the following formula $$F\text{+}CF\text{—}CF_2O\text{+}_n CF\text{—}COOH$$
$$\quad\;\;\,|\qquad\qquad\;\;|$$
$$\quad\;\;CF_3\qquad\quad\;CF_3$$

(n = 14 on the average) and 100 g of trifluorotrichloroethane was supplied into a 200 ml three-necked flask provided with a refluxing device. Then 10 g of thionyl chloride was added and the mixed solution was heated under stirring at 80° C. for 4 hours. After the reaction, unreacted SOCl₂, byproduct HCl and solvent trifluorotrichloroethane were removed by vacuum distillation to obtain acid chloride of the fluorine compound.

Separated from the above operations, 8 g (0.0027 mol) of 1,3-bis(4-aminophenoxy)benzene 1.9 g (0.017 mol) of triethylamine and 70 ml of dehydrated acetone, were supplied into a 100 ml three-necked flask provided with a refluxing device. Then 2.4 g (0.017 mol) of benzoyl chloride was added dropwise to the mixed solution under stirring at room temperature. After this addition, the reaction of the mixture was continued for one hour. The reaction product was filtered and the filtrate was added with ethanol and again filtered. The filtrate was column chromatographed to yield 2.55 g (0.0064 mol) of reaction product (I).

Into a 100 ml three-necked flask having a refluxing device was put 2.55 g (0.0064 mol) of reaction product (I), followed by further supply of 35 ml of acetone dehydrated with anhydrous magnesium sulfate and 0.47 g of triethylamine. Then 6 g (0.005 mol) of the previously prepared acid chloride of the fluorine compound was added dropwise into said three-necked flask, and the mixture was stirred sufficiently. After about one-hour reaction, the reaction solution was filtered and the filtrate was diluted with trifluorotrichloroethane and washed with methanol. Then the solvent trifluorotrichloroethane was distilled off to obtain 8.7 g (0.0031 mol) of a fluorine compound having the following structure:

(n=14)

EXAMPLE 4

A solution containing 24 g (0.0048 mol) of KRYTOX 157 FS-M of the following formula (n=29 on the average) and 70 g of trifluorotrichloroethane was fed into a 300 ml flask provided with a refluxing device. Then 100 ml of thionyl chloride was added and the mixture was reacted under stirring at 67° C. for 3 hours. Three drops of pyridine were also added to the reaction solution. Thereafter, unreacted thionyl chloride, solvent trifluorotrichloroethane and byproduct HCl were removed by vacuum distillation. There consequently obtained a fluorine compound of KRYTOX 157 FS-M terminated with acid chloride, said compound (C) having the structure of F—(C₃F₆—O)ₙC₂-F₄—COCl.

Separated from the above operations, a solution of 10 g of phenoxybenzoic acid in 100 ml of acetone was supplied into a 300 ml flask equipped with a refluxing device. Then 100 ml of thionyl chloride was added and the mixture was reacted under stirring at 67° C. for 3 hours. Three drops of pyridine was also added into the flask in the course of reaction. Thereafter, unreacted thionyl chloride, solvent acetone and byproduct HCl were removed by vacuum distillation to obtain acid chloride of phenoxybenzoic acid having the structure:

In another operation, 25 g (0.061 mol) of 2,2-bis(4(4-aminophenoxy)phenyl)propane having the following structure;

4.6 g (0.047 mol) of triethylamine and 400 ml of dehydrated acetone were supplied into a 1,000 ml three-necked flask provided with a refluxing device. To this solution, while stirring it at room temperature, there was added dropwise a solution formed by adding 400 ml of acetone to the previously prepared acid chloride of phenoxybenzoic acid. The mixture was reacted under stirring at 12° C. for 5 hours. After the reaction, the solution was filtered and then unreacted thionyl chloride, solvent acetone and byproduct HCl were removed by vacuum distillation. Column chromatography of the distillation residue gave 44 g of a compound (D) having the following structure:

Then 19 g (0.025 mol) of compound (D) was put into a 500 ml three-necked flask having a refluxing device, followed by supply of 25 g of triethylamine and 120 ml of acetone in a sealed state, and the mixture was stirred at 14° C. Then a solution of 55 g of fluorine compound (C) in 60 ml of well-dehydrated trifluorotrichloroethane was added dropwise to the above mixture to carry out a reaction for a period of 4 hours. After the reaction, the solution was filtered and then unreacted thionyl chloride, solvent acetone and byproduct HCl were removed by vacuum distillation. The distillation residue was dissolved in trifluorotrichloroethane and, after removing brown crystals, washed with water and ethanol to obtain 45 g of the objective product having the following structure:

EXAMPLE 5

By following the procedure of Example 1, there was obtained 12 g (0.0048 mol) of a fluorine compound [A] of KRYTOX 157 FS-L terminated with acid chloride. Separated from the above, 0.7 g (0.0023 mol) of 1,3-bis-(4-aminophenoxy)benzene of the formula;

1.9 g (0.017 mol) of triethylamine and 70 ml of dehydrated acetone, were supplied into a 500 ml three-necked flask equipped with a refluxing device. Then 12 g of the fluorine compound (A) was dissolved in a mixture of 10 ml of trifluorotrichloroethane and 30 ml of dehydrated acetone, and the solution was added dropwise into the three-necked flask. After this dropwise addition, the reaction was continued for one hour. After the reaction, trifluorotrichloroethane and byproduct HCl were removed by vacuum distillation. The resulting reaction product was diluted with trifluorotrichloroethane and washed with methanol. By distilling off the solvent trifluorotrichloroethane, there was obtained 10 g of a brown viscous compound having the following structure:

(n=14 on the average)

EXAMPLE 6

By following the procedure of Example 1, there was obtained 12 g (0.0048 mol) of a fluorine compound (A') of KRYTOX 157 FS-L terminated with acid chloride. Separated from the above, 0.8 g (0.002 mol) of 2-bis-(4-aminophenoxyphenyl)propane of the following structure;

4.6 g (0.047 mol) of triethylamine and 400 ml of dehydrated acetone were supplied into a 500 ml three-necked flask provided with a refluxing device. Then 12 g of the fluorine compound (A') was dissolved in 35 g of trichlorotrifluoroethane, and the solution was added slowly in droppings into the three-necked flask. After the reaction, trifluorotrichloroethane and byproduct HCl were removed by vacuum distillation. The resulting reaction product was diluted with trifluorotrichloroethane and washed with methanol. Then the solvent trifluorotrichloroethane was distilled off to obtain 11 g of a viscous compound having the following structure:

(n=14 on the average)

EXAMPLE 7

A solution consisting of 22 g of FOMBLIN Z-DIAC (produced by Montefluose Inc.) represented by the formula HOOC—Rf—COOH (wherein Rf represents $-(C_2F_4O)_x-(CF_2O)_y-(CF_2)_z$ ; $x:y:z=18:33:1$; average molecular weight 2,200) and 100 ml of trifluorotrichloroethane was supplied into a 500 ml flask equipped with a refluxing device. Then 50 ml of thionyl chloride was added and the mixture was reacted under stirring at 67° C. for 3 hours. Three drops of pyridine were also added into the flask. Thereafter, unreacted thionyl chloride, solvent trifluorotrichloroethane and reaction product HCl were removed by vacuum distillation. There was resultantly obtained a fluorine compound (E) of FOMBLIN Z-DIAC terminated with acid chloride at both ends of the molecular structure (ClOC—Rf—COCl).

Separated from the above operations, compound (A') was produced according to Example 1, and 10 g (0.02 mol) of (A') was put into a 200 ml three-necked flask provided with a refluxing device, followed by further supply thereinto of 30 ml of trifluorotrichloroethane, 100 ml of dehydrated acetone and 2 g of triethylamine. Then a trifluorotrichloroethane solution containing 22 g (0.01 mol) of fluorine compound (E) was added dropwise into the three-necked flask, and the mixture in the flask was heated to 60° C. and stirred well for conducting a reaction. About one hour thereafter, the reaction mixture was filtered and the filtrate was diluted with trifluorotrichloroethane and washed with methanol, after which the solvent trifluorotrichloroethane was distilled off to yield 15 g of a brown viscous compound having the following structure:

($x:y:z=18:33:1$, on the average; average molecular weight: 2,200).

EXAMPLE 8

By using 24 g of KRYTOX 157 FS-M, there was obtained a fluorine compound terminated with acid chloride in its molecular structure $(F(C_3F_6—O)_n\,C_2F_4—COCl)$ according to the same process as Example 4. There was also obtained 10 g of acid chloride of phenoxybenzoic acid in the same way as Example 4.

Separated from the above operations, 32 g (0.061 mol) of 2,2-bis(4(4-aminophenoxyphenyl)hexafluoropropane dehydrated with anhydrous magnesium sulfate, 4.6 g (0.047 ml) of triethylamine and 400 ml of acetone were supplied into a 1,000 ml three-necked flask provided with a refluxing device. Then a solution prepared by adding 10 g of the acid chloride of phenoxybenzoic acid to 100 ml of acetone was added dropwise into the flask under stirring at room temperature. The mixture was reacted under stirring at 12° C. for 5 hours. After the reaction, the reaction mixture was filtered and then unreacted thionyl chloride, solvent acetone and byproduct HCl were removed by vacuum distillation. The distillation residue was column chromatographed to yield 18 g of a compound (F) having the following structure:

Then 16 g (0.025 mol) of compound (F) was put into a 500 ml three-necked flask provided with a refluxing device, followed by further addition of 25 g of triethylamine and 120 ml of acetone, the mixture being stirred at 14° C. Thereafter, a solution consisting of 60 ml of well-dehydrated trifluorotrichloroethane and 25 g of the fluorine compound $(F(C_3F_6-O)_n-C_2F_4-COCl)$ was added dropwise into the mixture and continued the reaction over a period of 4 hours. After the reaction ended, the solution was filtered and then unreacted thionyl chloride, solvents acetone and trifluorotrichloroethane and byproduct HCl were removed by vacuum distillation. The distillation residue was dissolved in trifluorotrichloroethane and, after removing brown crystals, washed with water and ethanol to obtain 35 g of the objective refined product having the following structure:

EXAMPLES 9-14

An organic film-forming material composed of 4.5 g of a bis-phenol A type epoxy resin, 4 g of a resol type phenolic resin and 1.5 g of a polyvinylbutyral resin was dissolved in 2,000 g of cyclohexanone to prepare a solution (I). Then 0.5 g of each of fluoroalkyl ether compounds shown in Table 1, which had been prepared according to Example 1, was dissolved in 15 g of methyl ethyl ketone, and this solution was mixed with solution (I) to prepare a coating solution (II).

TABLE 1

| Compound No. | Molecular structure of compound | Appearance | Melting point (°C.) |
|---|---|---|---|
| 1 | Rf—CONH—⬡—O—⬡—O—⬡—NHCO—⬡ | brown and greasy | over 50° C. |
| 2 | Rf—CONH—⬡—CONH—⬡—O—⬡—O—⬡—NHCO—⬡—O—⬡ | brown and greasy | " |
| 3 | RF—CONH—⬡—O—⬡—C(CH₃)₂—⬡—O—⬡—NHCO—⬡—O—⬡ | brown and greasy | " |
| 4 | Rf—CONH—⬡—O—⬡—O—⬡—NHCO—Rf | brown and greasy | " |
| 5 | Rf—CONH—⬡—O—⬡—C(CH₃)₂—⬡—O—⬡—NHCO—Rf | brown and greasy | " |
| 6 | ⬡—CONH—⬡—O—⬡—O—⬡—NHCO—Rf—CONH—   | brown and greasy | " |

Rf represents $F(CF_3)-CF_2O)_n-CF(CF_3)-$ (n = 14 on the average or
$-(C_2F_4O)_x-(CF_2O)_y-(CF_2)_z-$ (x = 18, y = 33 and z = 1, all on the average)

A 1 μm thick amorphous silicon film was formed on an aluminum alloy substrate, and each sample of solution (II) was applied thereon to form a 50 nm thick coated film. This coated film was cured by heating at 200° C. for one hour. The surface tension of each of the cured films was measured by using water and benzene to determine the water and oil repellency of each film. The results are shown in Table 2.

Used as a Comparative Example was a 1 μm thick amorphous silicon film formed on an aluminum alloy substrate, with no additional coating film formed thereon.

As seen from the results shown in Table 1, any of the coating films according to this invention was larger in the contact angle and higher in the water and oil repellency than the film of Comparative Example.

TABLE 2

| Example No. | Compound No. | Contact angle (dig) at 25° C. | |
|---|---|---|---|
| | | Water | Benzene |
| 9 | 1 | 110 | 27 |
| 10 | 2 | 105 | 25 |
| 11 | 3 | 105 | 25 |
| 12 | 4 | 95 | 20 |
| 13 | 5 | 100 | 25 |
| 14 | 6 | 110 | 27 |
| Comparative Example | | 63 | 0 |

EXAMPLES 15-20

Samples of solution (II) containing the fluoroalkyl ether compounds specified in Table 1 were prepared in the same way as in Examples 9-14.

Then, a disc having a magnetic layer was prepared by first forming an Ni-P layer and then a Co layer on the surface of a 5.25 inch Al-alloy disc, then depositing on the Co layer a Ni-Co magnetic layer to a thickness of 50 nm, and further formed thereon a 50 nm thick carbon film. Then, each sample of solution (II) was applied on the disc by using a spin coater operated at 2,500 r.p.m. to form a 30 to 50 nm thick coated film. The coated film was preheated at 80° C. for 30 minutes and then heated at 230° C. for one hour to obtain a disc (I) coated with a cured film.

Lubricity of each of the thus obtained disc (I) samples was evaluated directly by using a sphere on disc sliding tester. In the evaluation test, by giving a load of 20 g to a sapphire spherical slider, the disc was rotated at a peripheral speed of 40 m/s under the conditions of an ambient atmospheric temperature of 25° C. and a relative humidity below 50%, and the disc lubricity was evaluated by the total number of rotations that the disc made until the organic coating film on the disc was ruptured. The results are shown in Table 3.

As a Comparative Example, there was used a disc prepared by coating on the above mentioned disc having the magnetic layer with KRYTOX 143 CZ (disclosed in U.S. Pat. No. 3,490,946) to a thickness of about 10 nm by using a spin coater, and further heating the coated film at 100° C. for 30 minutes.

As seen from the results of Table 3, the discs embodying the present invention are greater in the total number of rotations of disc until the organic coating layer ruptured in comparison with the comparative disc, indicating excellent lubricity of the discs produced in accordance with the present invention.

TABLE 3

| Example No. | Compound No. | Total number of rotations of disc till organic coating film was ruptured |
|---|---|---|
| 15 | 1 | >240000 |
| 16 | 2 | 55000 |
| 17 | 3 | 101000 |
| 18 | 4 | 50000 |
| 19 | 5 | 80000 |
| 20 | 6 | >240000 |
| Comparative Example | | <5000 |

EXAMPLE 21

Solution (II) formed in Example 15 was dissolved in N,N'-dimethylformamide to prepare a 2 wt % solution thereof. This solution was uniformly spin coated, at a spinner speed of 3,500 r.p.m., on a polyethylene terephthalate substrate washed sufficiently. Then the coating was dried at 120° C. for 15 minutes and N,N'-dimethylformamide was evaporated away to form an orientation controlling film having a thickness of 650 Å. This film was rubbed with a felt in a predetermined direction to obtain a substrate having an orientation controlling film.

Two pieces of thus obtained substrate were placed opposite to each other in such a way that their respective orientation controlling films faced each other, and the two substrates were joined with an adhesive comprising a polyester to make a liquid crystal display element. A phenylcyclohexane type liquid crystal (ZLI-1132, manufactured by Merc Inc.) was placed between the opposing orientation controlling films of the element, and the orienting characteristics of the liquid crystal were examined between a pair of orthogonal polarizing plates. The liquid crystal showed excellent orienting characteristics.

EXAMPLE 22

In toluene, 0.5 g of fluoroalkyl ether obtained in Example 1 and 1.5 g of polyimide precursor PIQ (manufactured by Hitachi Chemical Co., Ltd.) were dissolved to prepare a resin coating solution. This coating solution was spin coated and baked at 250° C. for 60 minutes to prepare a wiring insulating film. A semiconductor device having the insulating film was packaged with an epoxy molding resin using a phenolic novolak curing agent, thereby obtaining an LSI product for memory. This product was left in an atmosphere of 85° C. and 85% RH under application of a bias voltage. There took place no break or disconnection due to corrosion of Al wiring even after 3,000 hours of test, indicating excellent moistureproof reliability of this LSI product.

What is claimed is:

1. A laminate for a computer comprised of a substrate and a film comprising a composition containing a film forming resin and a fluoroalkyl ether having an amide bond in its molecular structure and represented by the following formula [I]

$(Rf_{\overline{m}}(CONH-X-NHCO-Y)_m$ [I]

wherein m is 1 or 2, provided that the two m's are not simultaneously 2; Rf represents

(n=1 to 50) or $(C_2F_4O)_x(CF_2O)_y(CF_2)_z$ (x=1 to 50, y=1 to 50, z=0 or 1); X represents (q represents $-CH_2-$, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-\overset{\overset{O}{\|}}{C}-$, $-S-$ or $-SO_2-$);

and Y represents

(n = 1 to 50).

2. A laminate according to claim 1, wherein the film forming resin comprises polyimide, polyetherimide, polyamideimide, polycarbonate, polyester, polyurethane, melamine resin, phenolic resin, polyhydroxystyrene, epoxy resin or unsaturated imide.

3. A coating material for LSI modules comprising a composition containing a film forming resin and a fluoroalkyl ether having an amide bond in its molecular structure and represented by the following formula [I]

$(Rf)_m(CONH-X-NHCO-Y)_m$      [I]

wherein m is 1 or 2, provided that the two m's are not simultaneously 2; Rf represents

(n=1 to 50) or $(C_2F_4O)_x(CF_2O)_y(CF_2)_z$ (x=1 to 50, y=1 to 50, z=0 or 1); X represents (q represents $-CH_2-$, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-\overset{\overset{O}{\|}}{C}-$, $-S-$ or $-SO_2-$);

and Y represents

(n = 1 to 50).

4. A coating material according to claim 3, wherein the film forming resin comprises polyimide, polyetherimide, polyamideimide, polycarbonate, polyester, polyurethane, melamine resin, phenolic resin, polyhydroxystyrene, epoxy resin or unsaturated imide.

5. A solid surface modifying composition comprising a film forming resin and a fluoroalkyl ether having an amide bond in its molecular structure and represented by the following formula [I]:

$(Rf)_m(CONH-X-NHCO-Y)_m$      [I]

wherein m is 1 or 2, provided that the two m's are not simultaneously 2; Rf represents

(n=1 to 50) or $(C_2F_4O)_x(CF_2O)_y(CF_2)_z$ (x=1 to 50, y=1 to 50, z=0 or 1); X represents (q represents $CH_2-$, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-\overset{\overset{O}{\|}}{C}-$, $-S-$ or $-SO_2-$);

and

Y represents

(n = 1 to 50).

6. A solid surface modifying composition according to claim 5, wherein the film forming resin comprises polyimide, polyetherimide, polyamideimide, polycarbonate, polyester, polyurethane, melamine resin, phenolic resin, polyhydroxystyrene, epoxy resin or unsaturated imide.

7. A method for modifying solid surfaces, which comprises coating on a solid surface as film a composition containing a film forming resin and a fluoroalkyl ether having an amide bond in its molecular structure and represented by the following formula [I]:

$(Rf)_{\overline{m}}(CONH-X-NHCO-Y)_m$ [I]

wherein m is 1 or 2, provided that the two m's are not simultaneously 2; Rf represents or (q represents $CH_2-$, $-\underset{CH_3}{\overset{CH_3}{\underset{|}{\overset{|}{C}}}}-$, $-\underset{CF_3}{\overset{CF_3}{\underset{|}{\overset{|}{C}}}}-$, $-\overset{O}{\overset{\|}{C}}-$, $-S-$ or $-SO_2-$);

and

Y represents  or $F+\underset{|}{\overset{CF_3}{\overset{|}{C}F}}-CF_2O)_{\overline{n}}\underset{|}{\overset{CF_3}{\overset{|}{C}F}}-$ (n=1 to 50) and curing the coated film.

8. A method according to claim 7, wherein the film forming resin comprises polyimide, polyetherimide, polyamideimide, polycarbonate, polyester, polyurethane, melamine resin, phenolic resin, polyhydroxystyrene, epoxy resin or unsaturated imide.

* * * * *

UNITED STATES PATENT AND TRADEMARK OFFICE
CERTIFICATE OF CORRECTION

PATENT NO. : 5,157,066

DATED : October 20, 1992

INVENTOR(S) : M. SHOJI, et al

It is certified that error appears in the above-identified patent and that said Letters Patent is hereby corrected as shown below:

Column 18, Claim 5, line 44, the portion of the formula
"(q represents $CH_2$-," should read
--(q represents -$CH_2$-,--

Column 19, claim 7, after Rf represents in line 2, delete the rest of the column and insert therefor:

(n = 1 to 50) or $-(C_2F_4O)_x-(CF_2O)_y-(CF_2)_z-$ (x = 1 to 50, y = 1 to 50, z = 0 or 1); X represents or

UNITED STATES PATENT AND TRADEMARK OFFICE
CERTIFICATE OF CORRECTION

PATENT NO. : 5,157,066
DATED : October 20, 1992
INVENTOR(S) : M. Shoji, et. al.

It is certified that error appears in the above-indentified patent and that said Letters Patent is hereby corrected as shown below:

Column 20, Claim 7, line 5, the portion of the formula
"(q represents $CH_2-$," should read -- (q represents $-CH_2-$,--.

Signed and Sealed this

Nineteenth Day of October, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,157,066

DATED : October 20, 1992

INVENTOR(S) : SHOJI, et al

It is certified that error appears in the above-identified patent and that said Letters Patent is hereby corrected as shown below:

On the title page, left-hand column, after "[22] Filed: Jul. 2, 1991 insert

--[30]  Foreign Application Priority Data
  Sep. 26, 1988 [JP]   Japan..................63-238727--

Signed and Sealed this

Twenty-sixth Day of July, 1994

Attest:

BRUCE LEHMAN

*Attesting Officer*    *Commissioner of Patents and Trademarks*